United States Patent
Corral et al.

(10) Patent No.: US 8,520,696 B1
(45) Date of Patent: Aug. 27, 2013

(54) TERMINAL SELECTION DIVERSITY FOR POWERLINE COMMUNICATIONS

(75) Inventors: Celestino A. Corral, Ocala, FL (US); Gregory A. Magin, Ocala, FL (US); Stanley J. Kostoff, II, Ocala, FL (US); John Chappel, Mississauga (CA); Ehab Tahir, Oakville (CA); Syed Adil Hussain, Ocala, FL (US); Wayne Daniel, Garland, TX (US); William E. Earnshaw, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 12/913,414

(22) Filed: Oct. 27, 2010

Related U.S. Application Data

(60) Provisional application No. 61/369,553, filed on Jul. 30, 2010.

(51) Int. Cl.
*H04L 12/66* (2006.01)
(52) U.S. Cl.
USPC ............................. 370/463; 370/464; 370/465
(58) Field of Classification Search
USPC ................. 370/463, 464–465, 459, 461, 462, 370/252
See application file for complete search history.

(56) References Cited

U.S. PATENT DOCUMENTS

| | | | |
|---|---|---|---|
| 6,985,714 B2 * | 1/2006 | Akiyama et al. | 455/402 |
| 7,406,536 B2 | 7/2008 | Efrati et al. | |
| 7,551,907 B2 | 6/2009 | French et al. | |
| 7,577,240 B2 | 8/2009 | Goodman | |
| 7,684,502 B2 | 3/2010 | Kurobe et al. | |
| 7,702,085 B2 | 4/2010 | Zumkeller et al. | |
| 7,804,917 B2 | 9/2010 | French et al. | |
| 7,856,032 B2 * | 12/2010 | Berkman | 370/463 |
| 7,953,105 B2 * | 5/2011 | Kurobe et al. | 370/459 |
| 8,275,344 B2 * | 9/2012 | Schwager et al. | 455/402 |
| 2003/0129978 A1 * | 7/2003 | Akiyama et al. | 455/426 |
| 2006/0073805 A1 * | 4/2006 | Zumkeller et al. | 455/402 |
| 2006/0268705 A1 * | 11/2006 | Kurobe et al. | 370/230 |
| 2007/0189182 A1 * | 8/2007 | Berkman et al. | 370/252 |
| 2007/0253394 A1 * | 11/2007 | Horiguchi et al. | 370/338 |
| 2008/0057866 A1 | 3/2008 | Schwager et al. | |
| 2008/0260010 A1 * | 10/2008 | Schwager et al. | 375/222 |
| 2008/0273613 A1 | 11/2008 | Kol | |

(Continued)

FOREIGN PATENT DOCUMENTS

| | | |
|---|---|---|
| EP | 1643658 | 4/2006 |
| EP | 1763146 | 3/2007 |

(Continued)

*Primary Examiner* — Chuong T Ho
(74) *Attorney, Agent, or Firm* — DeLizio Gilliam, PLLC

(57) ABSTRACT

Powerline communication networks can be subject to burst interference resulting in loss of throughput and data corruption. A transmitting network device and a receiving network device of a powerline communication network can be configured to select a best performing powerline terminal coupling configuration for powerline communications. The transmitting network device can determine performance measurements associated with each of a plurality of powerline communication channels. The transmitting network device can select a best performing powerline communication channel based on the performance measurements, and can provide an indication of the best performing powerline communication channel to the receiving network device. The transmitting and the receiving network devices can each configure their respective terminal connections to switch to the best performing powerline communication channel. Subsequent communications between the transmitting and the receiving network devices can be initiated via the best performing powerline communication channel.

25 Claims, 7 Drawing Sheets

(56) References Cited

U.S. PATENT DOCUMENTS

| | | | |
|---|---|---|---|
| 2008/0298382 A1* | 12/2008 | Galli et al. | 370/438 |
| 2009/0060060 A1 | 3/2009 | Stadelmeier et al. | |
| 2010/0061433 A1* | 3/2010 | Stadelmeier et al. | 375/222 |
| 2011/0051786 A1* | 3/2011 | Schwager et al. | 375/222 |
| 2011/0110408 A1* | 5/2011 | Schwager et al. | 375/222 |
| 2011/0116555 A1* | 5/2011 | Schwager et al. | 375/257 |
| 2011/0129007 A1* | 6/2011 | Schwager et al. | 375/224 |
| 2011/0176598 A1* | 7/2011 | Kohout et al. | 375/227 |
| 2012/0026908 A1* | 2/2012 | Tzannes et al. | 370/252 |
| 2012/0093240 A1* | 4/2012 | McFarland et al. | 375/257 |
| 2012/0163436 A1* | 6/2012 | Stadelmeier et al. | 375/222 |

FOREIGN PATENT DOCUMENTS

| | | |
|---|---|---|
| EP | 1858174 | 11/2007 |
| EP | 2061160 | 5/2009 |
| EP | 2073471 | 6/2009 |
| EP | 2154789 | 2/2010 |
| EP | 2157704 | 2/2010 |
| WO | WO-2008135982 | 11/2008 |
| WO | WO-2009024249 | 2/2009 |
| WO | WO-2009056181 | 5/2009 |
| WO | WO-2011001430 | 1/2011 |

* cited by examiner

TERMINAL SELECTION DIVERSITY FOR POWERLINE COMMUNICATIONS

BACKGROUND

Embodiments of the inventive subject matter generally relate to the field of powerline communication and, more particularly, to terminal selection diversity for powerline communications.

Electric power lines are typically used for distributing electric power to buildings and other structures. Besides providing electric power, the electric power lines can also be used to implement broadband over powerline communications via the wired powerline communication network within the buildings and other structures. Powerline communication provides a means for networking electronic devices (e.g., consumer electronics, smart appliances, etc.) together and also for connecting the electronic devices to the Internet. To facilitate powerline communication, a modulated carrier signal is typically impressed on the electric power line. Depending on the type of data to be transmitted, powerline communication standards, and capabilities of the electric power line, different frequency bands may be used to transmit the data over the powerline network.

SUMMARY

Various embodiments for terminal selection diversity for powerline communications are disclosed. In one embodiment, a first network device of a powerline communication network determines to establish communications with a second network device of the powerline communication network. Performance measurements associated with each of a plurality of powerline communication channels associated with the powerline communication network are determined at the first network device. A best performing powerline communication channel is determined, at the first network device, from the plurality of powerline communication channels based on the performance measurements. An indication of the best performing powerline communication channel is provided from the first network device to the second network device to cause a terminal connection at the second network device to be changed to the best performing powerline communication channel. A terminal connection at the first network device is changed to the best performing powerline communication channel. Communications are initiated from the first network device to the second network device via the best performing powerline communication channel.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
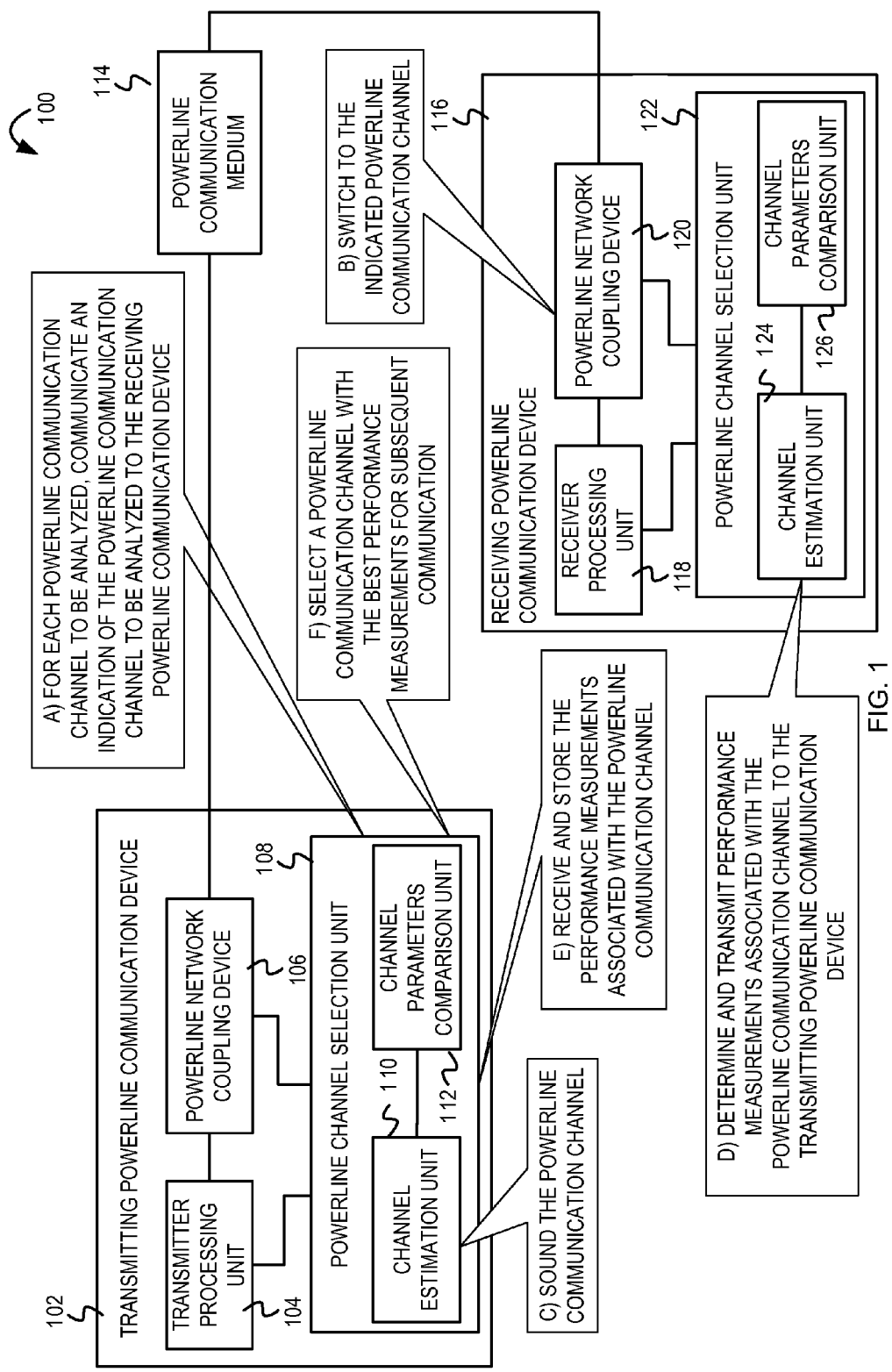
FIG. 1 is an example conceptual diagram illustrating a powerline communication system configured for terminal selection diversity for powerline communication.

The description that follows includes exemplary systems, methods, techniques, instruction sequences, and computer program products that embody techniques of the present inventive subject matter. However, it is understood that the described embodiments may be practiced without these specific details. For instance, although examples refer to implementing a terminal selection diversity technique in powerline communication systems that use power outlets with a specific configuration of three terminals, in other embodiments the terminal selection diversity technique can be implemented in the powerline communication systems that use power outlets with different terminal configurations or with a different number of terminals. In other instances, well-known instruction instances, protocols, structures, and techniques have not been shown in detail in order not to obfuscate the description.

Multiple-input multiple-output (MIMO) techniques involve using multiple antennas at a transmitting network device and at a receiving network device to improve capacity gain and to exploit the diversity of signal paths in a high interference, high noise communication network (e.g., a powerline communication network). The powerline network infrastructure (e.g., wires, wall outlets, etc.) available throughout a home, a building, or other structure can be used to implement the MIMO techniques for powerline communication. To achieve high diversity and gain, the MIMO techniques utilize independent samples of the signal transmitted by the transmitting network device. However, in the powerline communication network, the receiving network device may or may not be able to obtain independent samples of the transmitted signal because of correlation between different powerline communication channels of the powerline communication network, interference between independent powerline networks supported by a common powerline communication medium, etc. Moreover, depending on the requisite space-time coding diversity, the MIMO techniques can be complex to implement in the powerline communication network. For example, Nt antennas at the transmitting network device and Nr antennas at the receiving network device may be needed to achieve a diversity order of Nt×Nr using the MIMO techniques.

Powerline communication devices can be configured to implement a switch diversity technique for analyzing powerline communication channels, identifying the best performing powerline communication channel, and subsequently transmitting data via the best performing powerline communication channel. The powerline communication channel is represented by a combination of a coupling of two power outlet terminals at the transmitting powerline communication device, a coupling of two power outlet terminals at the receiving powerline communication device, and a grounding configuration. In one example, a powerline communication channel can be represented by a line-neutral (L-N) connection at the transmitting powerline communication device, an L-N connection at the receiving powerline communication device, and an open ground configuration. For each powerline communication channel to be analyzed, the transmitting powerline communication device can sound the powerline communication channel and can determine performance measurements associated with the powerline communication channel (e.g., from the receiving powerline communication device). The transmitting powerline communication device can store the performance measurements associated with the powerline communication channel along with an indication of the powerline communication channel. After the powerline communication channels are analyzed, the transmitting powerline communication device can select the powerline communication channel with the best performance measurements and can communicate an indication of the best performing powerline communication channel to the receiving powerline communication device. The transmitting powerline communication device and the receiving powerline communication device can then switch to and communicate via the best performing powerline communication channel.

Furthermore, in one embodiment, an optimal coupler configuration that evaluates the performance of all possible powerline communication channels (i.e., all possible terminal connections and grounding configurations) can be implemented to determine the best performing powerline communication channel. However, this can involve a relatively large number of performance measurements, can necessitate a relatively large amount of storage memory, and can increase the amount of time spent in identifying the best performing powerline communication channel ("testing duration"). Consequently, in another embodiment, a simplified coupler configuration referred to as the "smart" coupler configuration that analyses only a subset of the powerline communication channels (i.e., a subset of the terminal connections and grounding configurations) can be implemented. The smart coupler configuration can reduce implementation complexity, the number of performance measurements, storage memory, overhead, and the testing duration without compromising performance. Moreover, the switch diversity technique described herein may be simpler to implement as compared to existing MIMO techniques and may not utilize additional antennas at the transmitting and the receiving powerline communication devices. The switch diversity technique can also improve performance and throughput of the data communication in the powerline communication network by enabling the transmitting powerline communication device and the receiving communication powerline device to switch to a different powerline communication channel if the performance of the current powerline communication channel deteriorates.

FIG. 1 is an example conceptual diagram illustrating a powerline communication system 100 configured for terminal selection diversity for powerline communication. FIG. 1 depicts a transmitting powerline communication device 102 and a receiving powerline communication device 116. The transmitting powerline communication device 102 comprises a transmitter processing unit 104, a powerline network coupling device 106, and a powerline channel selection unit 108. The powerline channel selection unit 108 comprises a channel estimation unit 110 and a channel parameters comparison unit 112. Likewise, the receiving powerline communication device 116 comprises a receiver processing unit 118, a powerline network coupling device 120, and a powerline channel selection unit 122. The powerline channel selection unit 122 comprises a channel estimation unit 124 and a channel parameters comparison unit 126. It is noted that although FIG. 1 describes the powerline communication device 102 comprising functionality for transmitting data packets and the powerline communication device 116 comprising functionality for receiving data packets, the powerline communication device 102 may receive data packets and the powerline communication device 116 may transmit data packets.

Figure 2:
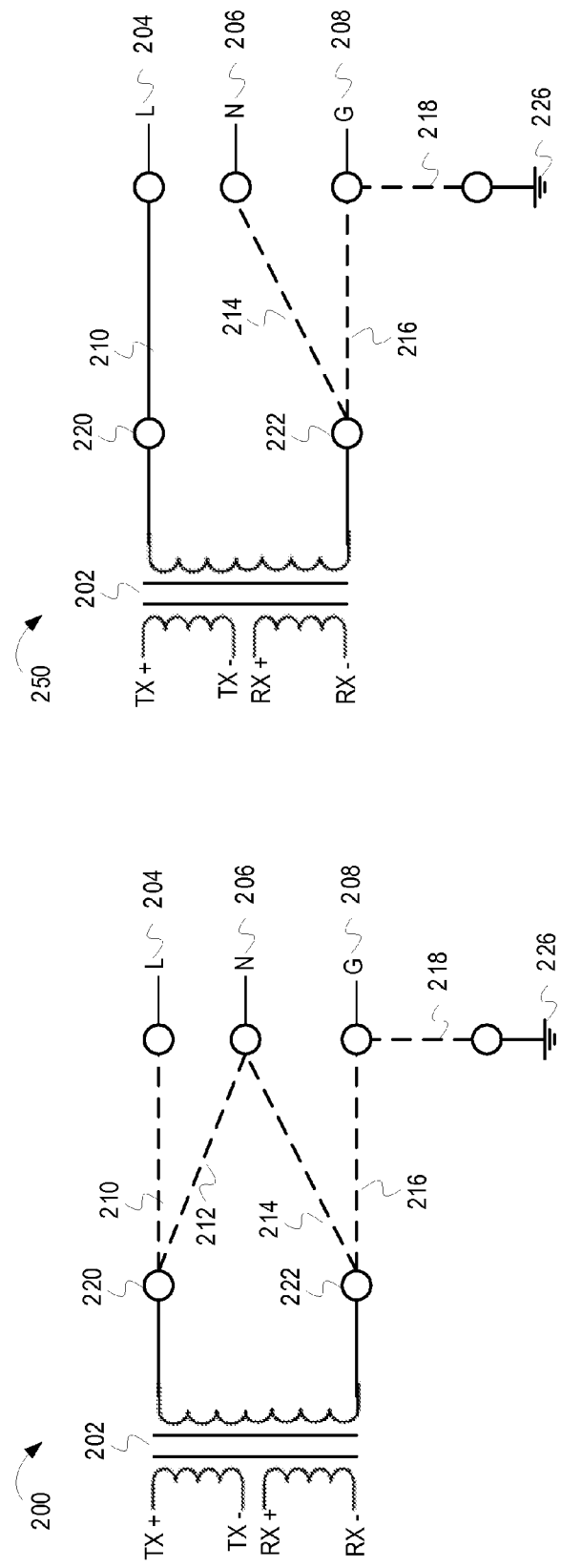
FIG. 2A illustrates various embodiments for coupling a powerline communication device to a powerline communication channel.
FIG. 2B illustrates all possible terminal connections that represent a powerline communication channel between powerline communication devices.

Typically, several transformers are used to convert (e.g., by decreasing voltage and frequency) and distribute electric power from a power generation plant to buildings and other infrastructure. The secondary winding of the last distribution transformer is typically connected to the building panel board using three (or four) wires. One wire is for a neutral line and the others wires for the different voltage phases. From the panel board, the power is then distributed through the building using several branch circuits consisting typically of three wires (e.g., as depicted in FIG. 2A) namely Line (also known as Live or Phase), Neutral, and Ground (or protective Earth). Hence, the powerline communication medium can offer potential powerline communication channels based on the line-neutral (L-N), line-ground (L-G), and neutral-ground (N-G) connection options.

The transmitting powerline communication device 102 can exchange data packets with the receiving powerline communication device 116 via a powerline communication medium 114. However, prior to transmitting the data packets to the receiving powerline communication device 116, the transmitting powerline communication device 102 analyses multiple powerline communication channels that constitute the powerline communication medium. A powerline communication channel can be represented as a combination of A) a coupling of two powerline outlet terminals at the transmitting powerline communication device 102, B) a coupling of two powerline output terminals at the receiving powerline communication device 116, and C) a grounding configuration. Communication between the transmitting powerline communication device 102 and the receiving powerline communication device 116 is typically initiated on a default powerline communication channel. In one example, the default powerline communication channel can be represented by a line-neutral (L-N) connection at the transmitting powerline communication device 102 and the receiving powerline communication device 116 and an open ground configuration. In other words, to yield the default powerline communication channel, A) the transmitting powerline communication device 102 is connected to its line and neutral power outlet terminals, B) the receiving powerline communication device 116 is connected to its line and neutral power outlet terminals, and C) the ground terminals are unconnected (i.e., open). However, it is noted that the default powerline communication channel can be represented by any suitable powerline outlet terminal connections at the transmitting and the receiving powerline communication devices. The powerline communication medium 114 is a shared medium that enables multiple powerline communication devices to contend for control to transmit via the powerline medium. Initiating communication on the default powerline communication channel can ensure that other powerline communication devices are cognizant of the transmitting and the receiving powerline communication devices. The transmitting powerline communication device 102 executes operations for analyzing the default powerline communication channel and one or more other powerline communication channels, as will be described with reference to stages A-E.

At stage A, the powerline channel selection unit 108 of the transmitting powerline communication device 102 selects a powerline communication channel to be analyzed and communicates an indication of the powerline communication channel to the receiving powerline communication device 116. In one implementation, the powerline channel selection unit 108 can identify the powerline communication channel to be analyzed and can transmit a message to the receiving powerline communication device 116 explicitly identifying the selected powerline communication channel. For example, the powerline channel selection unit 108 may transmit a message indicating that a powerline communication channel represented by a line-ground (L-G) connection at the transmitting and the receiving powerline communication devices and an open ground configuration will be analyzed. In another implementation, both the transmitting powerline communication device 102 and the receiving powerline communication device 116 may each maintain an internal channel list. The internal channel list can comprise multiple entries, each of which identify a powerline communication channel represented by a grounding option and a powerline outlet terminal connection option for the transmitting powerline communication device 102 and the receiving powerline communication device 116. For example, a first entry in the internal channel list can identify a first powerline communication channel represented by a line-neutral (L-N) connection at the transmitting powerline communication device 102 and the receiving powerline communication device 116 and an open ground configuration. A second entry in the internal channel list can identify a second powerline communication channel represented by the L-N connection at the transmitting powerline communication device 102 and the receiving powerline communication device 116 and a ground to earth configuration (i.e., ground terminal connected to Earth). The powerline channel selection unit 108 can transmit an index of the powerline communication channel to be analyzed as the indication of the powerline communication channel. For example, the second powerline communication channel represented by the L-N connection at the transmitting powerline communication device 102 and the receiving powerline communication device 116 and the ground to earth configuration may correspond to an index of "2". Accordingly, the powerline channel selection unit 108 may transmit the index of "2" to the receiving powerline communication channel 116. In one implementation, the powerline channel selection unit 108 can cause the receiving powerline communication device 116 to switch from the ground to earth configuration to the open ground configuration and vice versa by toggling a single bit (e.g., a least significant bit of the index).

At stage B, the powerline network coupling device 120 of the receiving powerline communication device 116 switches to the indicated powerline communication channel. As described above, in some implementations, the powerline channel selection unit 126 of the receiving powerline communication device 116 may receive a message that explicitly specifies the powerline communication channel to be analyzed. On receiving the message, the powerline channel selection unit 126 can direct the powerline network coupling device 120 to couple to the appropriate powerline outlet terminals of the receiving powerline communication device 116. In another implementation, the powerline channel selection unit 126 can receive an index that corresponds to the powerline communication channel to be analyzed. The powerline channel selection unit 126 can access the internal channel list on the receiving powerline communication device 116, can identify the powerline communication channel that corresponds to the received index, and can accordingly cause the powerline network coupling device 120 to couple to the appropriate powerline outlet terminals of the receiving powerline communication device 116.

At stage C, the channel estimation unit 110 of the transmitting powerline communication device 102 sounds the selected powerline communication channel. Sounding the powerline communication channel involves transmitting a predetermined or known sequence along the powerline communication channel to estimate characteristics and performance of the powerline communication channel. In one example, the known sequence can be a sounding request message. The sounding request message may be a physical layer convergence procedure (PLCP) protocol data unit (PPDU), a medium access control (MAC) protocol data unit (MPDU), or another suitable message format. The sounding request message may also be a quality of service (QoS) Null data frame that indicates the start of calibration of the powerline communication channel. In some implementations, the channel estimation unit 110 can set a flag in a header of the transmitted message to indicate that the transmitted message is a sounding request message. Knowledge of the characteristics and performance measurements of the powerline communication channel can enable the powerline channel selection unit 108 to determine whether the powerline communication channel is suitable for transmitting data packets to the receiving powerline communication device 116. Also, knowledge of the performance measurements can enable the transmitter processing unit 104 to appropriately adjust the transmit power and correct for amplitude and phase differences to ensure that the receiving powerline network device 116 correctly receives the transmitted data packets.

At stage D, the channel estimation unit 124 of the receiving powerline communication device 116 determines and transmits performance measurements associated with the powerline communication channel to the transmitting powerline communication device 102. In response to receiving the sounding request message (transmitted at stage C) from the transmitting powerline communication device 102, the channel estimation unit 124 can transmit a sounding response message comprising at least the performance measurements associated with the powerline communication channel. In one example, the sounding response message can comprise an acknowledgement (ACK) message and the performance measurements associated with the powerline communication channel. In another example, the channel estimation unit 124 can first acknowledge receipt of the sounding request message by transmitting the ACK frame. Next, the channel estimation unit 124 can transmit, in a separate message, the performance measurements associated with the powerline communication channel. The sounding response message can be transmitted a predetermined interval (e.g., a short interframe space (SIFS) interval) after the sounding request message is received. In one embodiment, the channel estimation unit 124 can determine the performance measurements associated with the powerline communication channel, including a signal to noise ratio (SNR) and a bit error rate (BER) of the powerline communication channel. The channel estimation unit 124 can transmit the performance measurements associated with the powerline communication channel as part of the sounding response message.

Additionally, in response to receiving the sounding request message from the transmitting powerline communication device 102, the channel estimation unit 124 can also perform channel adaptation and can construct, as part of the performance measurements, a tone map to characterize the powerline communication channel being analyzed. The tone map can indicate channel parameters, number of bits (and consequently data rate) that can be supported by the powerline communication channel, etc. As part of the performance measurements, the channel estimation unit 124 can transmit the tone map associated with the powerline communication channel and an indication of the powerline communication channel (e.g., an index that corresponds to the powerline communication channel) to the transmitting powerline communication device 102. In some implementations, the channel estimation unit 124 can transmit the performance measurements associated with the powerline communication channel via the same powerline communication channel on which the sounding request message was received. In another implementation, the channel estimation unit 124 can transmit the performance measurements associated with the powerline communication channel via the default powerline communication channel. It is noted, however, that in some embodiments, the channel estimation unit 110 of the transmitting powerline communication device 102 can determine at least a subset of the performance measurements associated with the powerline communication channel based on a response received from the receiving powerline communication device 116.

At stage E, the powerline channel selection unit 108 of the transmitting powerline communication device 102 stores the performance measurements associated with the powerline communication channel. The powerline channel selection unit 108 can store, in a local candidate channel data structure, an indication of the powerline communication channel (e.g., an index that corresponds to the powerline communication channel) and the performance measurements (e.g., BER, SNR, throughput, data rate, tone maps, etc.) associated with the powerline communication channel. The powerline channel selection unit 108 can then access the internal channel list and can determine whether another powerline communication channel is to be analyzed. As will be described with reference to FIGS. 2A and 2B, some or all of the powerline outlet terminal connections at the transmitting and the receiving powerline communication devices that correspond to the powerline communication channels can be analyzed depending on whether an optimal powerline network coupling device ("optimal coupler") 200 or a smart powerline network coupling device ("smart coupler") 250 is implemented. At stage E, if the powerline channel selection unit 108 determines that another powerline communication channel is to be analyzed, the powerline channel selection unit 108 can identify the next powerline communication channel.

The operations described above in stages A-E whereby the transmitting powerline communication device 102 directs the receiving powerline communication device 116 to switch to a powerline communication channel and determines and stores performance measurements associated with the powerline communication channel are executed for each powerline communication channel in the internal channel list. After all the powerline communication channels identified by the internal channel list are analyzed, operations described in stage F are executed to select a powerline communication channel for exchanging subsequent data packets.

At stage F, the channel parameters comparison unit 112 of the transmitting powerline communication device 102 selects a powerline communication channel with the best performance measurements ("preferred powerline communication channel") for subsequent communication. The transmitter processing unit 104 can then transmit an indication of the preferred powerline communication channel to the receiving powerline communication device 116. The powerline channel selection unit 108 can also cause the powerline network coupling device 106 to switch to the preferred powerline communication channel to transmit subsequent data packets to the receiving powerline communication channel. On receiving the indication of the preferred powerline communication channel, the receiving processing unit 118 can cause the powerline network coupling device 120 of the receiving powerline communication device 116 to switch to the preferred powerline communication channel to receive subsequent data packets from the transmitting powerline network device 102. It is noted that the choice of which powerline communication channel to use for transmitting the subsequent data packets is the domain of the transmitting powerline communication device 102. The receiving powerline communication device 116 can generate and communicate the performance measurements associated with the powerline communication channels to the transmitting powerline communication device 102. The receiving powerline communication device 116 can then wait for the transmitting powerline communication device 102 to choose the preferred powerline communication channel.

It is noted that the receiving powerline communication device 116 can also execute the operations described above in stages A-F for analyzing the powerline communication channel and for identifying a preferred powerline communication channel due to the asymmetry of the powerline communication medium. Thus, the transmitting powerline communication device 102 can select a first preferred powerline communication channel, which the transmitting powerline communication device 102 deems to be associated with the best performance measurements. Likewise, the receiving powerline communication device 116 can select a second preferred powerline communication channel, which the receiving powerline communication device 116 deems to be associated with the best performance measurements. The transmitting powerline communication device 102 can transmit data packets to the receiving powerline communication device 116 via the first preferred powerline communication channel. The transmitting powerline communication device 102 can switch to the second preferred powerline communication channel to receive data packets from the receiving powerline communication device 116.

Furthermore, as will be described below with reference to FIGS. 3-6, the transmitting powerline communication device 102 and the receiving powerline communication device 116 typically initiate operations described herein on the default powerline communication channel. If the default powerline communication channel is selected as the preferred powerline communication channel with the best performance measurements, subsequent data messages and overhead messages (e.g., acknowledgement messages, etc.) can be transmitted via the default powerline communication channel. If a non-default powerline communication channel is selected as the preferred powerline communication channel, subsequent data packets can be transmitted via the preferred non-default powerline communication channel. However, the overhead messages can still be transmitted via the default powerline communication channel. With reference to the above example, where the transmitting powerline communication device 102 selects the first preferred powerline communication channel, the transmitting powerline communication device 102 can transmit a data packet to the receiving powerline communication device 116 via the first preferred powerline communication channel. Assuming that the first preferred powerline communication channel is not the default powerline communication channel, the transmitting powerline communication device 102 can switch to the default powerline communication channel to receive an acknowledgement message from the receiving powerline communication device 116. Likewise, the receiving powerline communication device 116 can receive the data packet from the transmitting powerline communication device 102 via the first preferred powerline communication channel and can switch to the default powerline communication channel to transmit the acknowledgement message. It is noted that in some implementations, the default powerline communication channel may be used for communicating overhead messages if legacy powerline communication devices are present in the powerline network. However, in some implementations, if the legacy powerline communication devices are not present in the powerline network, both overhead messages and data messages may be transmitted via a non-default powerline communication channel if selected as the preferred powerline communication channel.

FIG. 2A illustrates various embodiments of a powerline communication channel. Optimal coupler configuration 200 depicts a transformer 202 that couples the powerline communication device (depicted in FIG. 2A as TX and RX) to the powerline circuitry (e.g., a powerline outlet). The primary winding of the transformer 202 comprises two terminals 220 and 222, which can connect to a line terminal 204, a neutral terminal 206, or a ground terminal 208 of the powerline circuitry. A transmit circuitry of the powerline communication device is connected to a first secondary winding of the transformer 202 and a receive circuitry of the powerline communication device is connected to a second secondary winding of the transformer 202. Dotted connection 210 represents a potential connection between the terminal 220 of the transformer 202 and the line terminal 204. Dotted connection 212 represents a potential connection between the terminal 220 of the transformer 202 and the neutral terminal 206. Dotted connection 214 represents a potential connection between the terminal 222 of the transformer 202 and the neutral terminal 206. Dotted connection 216 represents a potential connection between the terminal 222 of the transformer 202 and the ground terminal 208. In addition, the ground terminal 208 can either be coupled to earth ground 226 or not (left open). Dotted connection 218 represents a potential connection between the ground terminal 208 and the earth ground 226.

The optimal coupler configuration 200 represents all possible options for connecting the transmitting powerline communication device 102 of FIG. 1 to the powerline circuitry. Using the optimal coupler configuration 200, the transmitting powerline communication device 102 can establish an L-N connection, an L-G connection, or an N-G connection. For each of these connections, the transmitting powerline communication device 102 can establish an open ground configuration or a ground to earth configuration. Likewise, the optimal coupler configuration 200 can also be implemented at the receiving powerline communication device 116. Using the optimal coupler configuration 200, eighteen ($2 \times 3^2$) different terminal connections (depicted in FIG. 2B) each of which represent a powerline communication channel between the transmitting powerline communication device 102 and receiving powerline communication device 116 can be analyzed. For example, a powerline communication channel can be represented by the L-N connection at the transmitting powerline communication device 102, the L-N connection at the receiving powerline communication device 116, and an open ground configuration. As another example, another powerline communication channel can be represented by the L-N connection at the transmitting powerline communication device 102, an N-G connection at the receiving powerline communication device 116, and a ground to earth configuration. Using the optimal coupler configuration 200, the transmitting powerline communication device 102 and the receiving powerline communication device 116 can analyze all the powerline communication channels that are represented by the terminal connections of FIG. 2B. The transmitting powerline communication device 102 and the receiving powerline communication device 116 can each separately select the preferred powerline communication channel for subsequent communication.

The optimal coupler configuration 200 described above assumes that powerline communication channels represented by all the terminal connection options and grounding options are analyzed to identify the powerline communication channel with the best performance. However, analyzing all the powerline communication channels can increase the time for selecting the preferred powerline communication channel, the time interval for which data packets (e.g., application data) cannot be transmitted, and the amount of memory necessary for storing the internal channel list and the performance measurements associated with the powerline communication channels. The smart coupler configuration 250 enables a subset of the powerline communication channels to be analyzed to identify the best powerline communication channel for transmitting data packets, while reducing storage and test time requirements. The subset of the powerline communication channels to be analyzed can be determined based on executing powerline communication channel tests, historical analysis, simulations, field tests, etc.

The smart coupler configuration 250 comprises the transformer 202 that couples the powerline communication device to the powerline circuitry as described above with reference to the optimal coupler configuration 200. In one example, as depicted in FIG. 2A, it may determined that the powerline communication channels that comprise the neutral-ground (N-G) connection (with either an open ground or a ground to earth configuration) need not be analyzed for the smart coupler configuration 250. For example, based on analysis of the powerline communication channels, it may be determined that the performance measurements associated with the powerline communication channels that comprise the N-G connection at the transmitting powerline communication device 102 and/or the receiving powerline communication device 116 do not meet performance thresholds. Thus, to implement the smart coupler configuration 250, the transmitting powerline communication device 102 and the receiving powerline communication device 116 only use the L-N and the L-G connection options along with the grounding options. In other words, the N-G connection option is disabled. In FIG. 2A, the smart coupler configuration 250 depicts the connection 210 between the first terminal 220 of the transformer 202 and the line terminal 204 as a solid line to indicate that the line terminal 204 is always connected to the first terminal of the transformer 202. In other words, the first terminal 220 may not be connected to the neutral terminal 206 and therefore, the dotted connection 212 previously depicted in the optimal coupler configuration 200 is not depicted as part of the smart coupler configuration 250. Because the smart coupler 250 can use the L-G or the L-N connection options, the second terminal 222 of the transformer 202 may be connected to either the neutral terminal 206 or the ground terminal 218, as depicted by the dotted connections 214 and 216 respectively. Using the smart coupler configuration 250, eight ($2 \times 2^2$) different terminal connections each of which represent a powerline communication channel between the transmitting powerline communication device 102 and the receiving powerline communication device 116 can be analyzed. With reference to FIG. 2B, only the powerline communication channels represented by indices 1-4 and 7-10 may be analyzed in the smart coupler configuration 250. In some implementations, the subset of the powerline communication channels to be analyzed can be stored in the internal channel list. In another implementation, an indication of whether a particular powerline communication channel is to be analyzed can be stored in the internal channel list. For example, the internal channel list can comprise a flag, corresponding to each powerline communication channel, that indicates whether the powerline communication channel should be analyzed. Thus, a flag may be assigned a value of "1" if the corresponding powerline communication channel should be analyzed. Alternately, a flag may be assigned a value of "0" if the corresponding powerline communication channel should not be analyzed.

It is noted that although FIG. 2A describes the powerline channel selection unit 108 analyzing only the powerline communication channels that comprise only the L-G and/or the L-N connections at the transmitting powerline communication device 102 and the receiving powerline communication device 116 in the smart coupler configuration 250, embodiments are not so limited. The smart coupler configuration 250 can be modified so that the operations described herein can be executed for any suitable subset of the available terminal connection options. For example, instead of analyzing the powerline communication channels that comprise only the L-N and/or the L-G connections, the transmitting powerline communication device 102 may only analyze the powerline communication channels that comprise the L-N and/or the N-G connections (and may not use the L-G connection). As another example, the transmitting powerline communication device 102 may only analyze the powerline communication channels that comprise the open ground configuration (and may not use the ground to earth configuration).

Various metrics can be used to analyze the performance of the optimal coupler configuration 200 and the smart coupler configuration 250 relative to each other and also relative to a traditional powerline coupler that uses only the default powerline communication channel (in this case, the powerline communication channel represented by the L-N connection and the open ground configuration). The gain of the optimal coupler configuration 200 relative to the smart coupler configuration 250 can be represented as a percentage improvement illustrated by Eq. 1, where $T_{optimal}$ and $T_{L-N}$ are the throughput of the optimal and traditional powerline coupler, respectively.

$$\text{Improvement} = \frac{T_{optimal} - T_{L-N}}{T_{L-N}} \quad \text{Eq. 1}$$

The performance capability of the couplers can be determined in accordance with Eq. 2, which weights each throughput x by the probability of its appearance p(x)

$$E\{x\} = \int x \cdot p(x) dx \quad \text{Eq. 2}$$

Eq. 3 depicts a relative throughput metric for the coupler ($\phi_{coupler}$) that integrates the throughput difference for each coupler relative to the traditional powerline coupler but normalizes it by the number of channel measurements. In Eq. 3, $T_{coupler}$ is the throughput of the selected coupler configuration, $T_{L-N}$ is the throughput of the traditional coupler, and $M_{coupler}$ is the number of channel measurements required to achieve the performance of $T_{coupler}$.

$$\phi_{coupler} = \frac{\Sigma(T_{coupler} - T_{L-N})}{M_{coupler}} \quad \text{Eq. 3}$$

Figure 3:
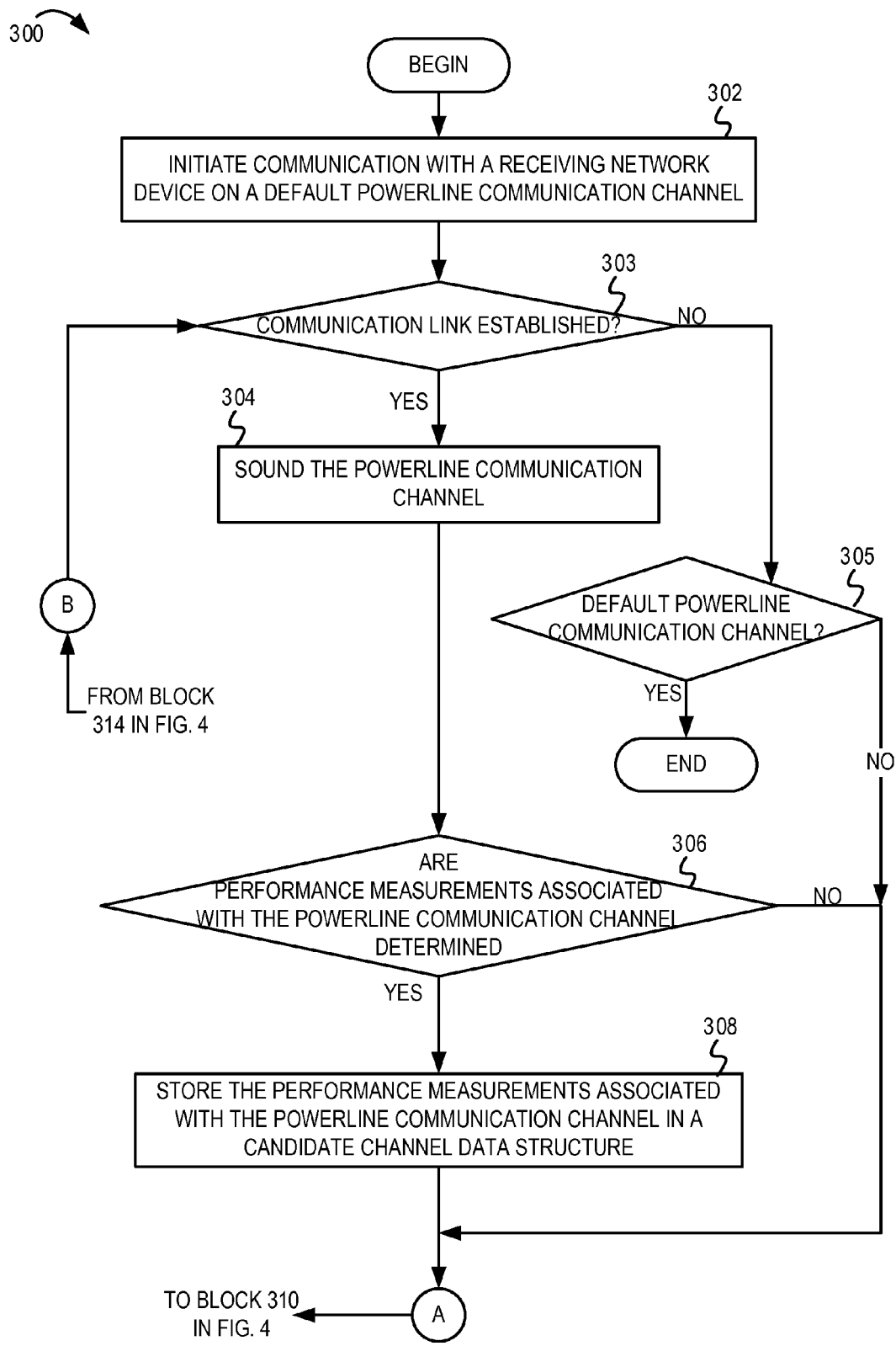
FIG. 3 depict a flow diagram illustrating example operations for terminal selection diversity for powerline communications.
Figure 4:
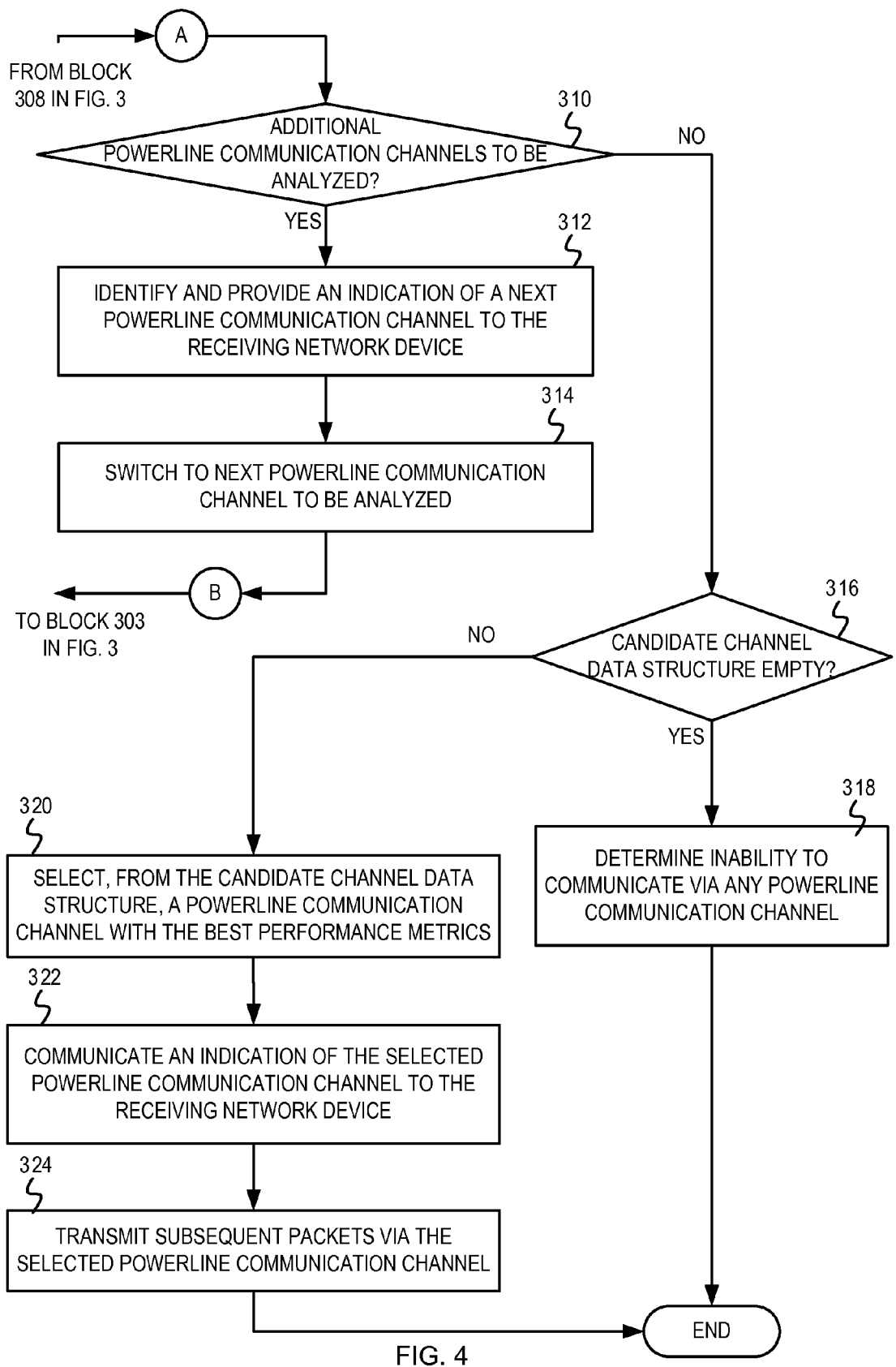
FIG. 4 is a continuation of FIG. 3 and depicts the flow diagram illustrating example operations for terminal selection diversity for powerline communications.

FIG. 3 and FIG. 4 depict a flow diagram ("flow") 300 illustrating example operations for terminal selection diversity for powerline communications. The flow 300 begins at block 302 in FIG. 3.

At block 302, communication with a receiving network device is initiated on a default powerline communication channel. For example, the transmitting powerline communication device 102 of FIG. 1 initiates communication with the receiving powerline communication device 116. In one implementation, the transmitter processing unit 104 can transmit a message to the receiving powerline communication device 116 indicating that the powerline communication channels are to be analyzed. In response to receiving the message from the transmitter processing unit 104, the receiver processing unit 118 can cause the powerline network coupling device 120 to listen on (or to switch to) the default communication channel for subsequent communications from the transmitting powerline communication device 102. The default communication channel is represented by an initial known terminal connection configuration. In one example, the default powerline communication channel may be represented by an L-N connection at the transmitting powerline communication device 102, an L-N connection at the receiving powerline communication channel 116, and an open ground configuration. To initialize communication on the default powerline communication channel, the transmitting powerline communication device 102 and the receiving powerline communication device 116 can each establish the L-N connection and can leave the ground terminal open (i.e., unconnected). The flow continues at block 303.

At block 303, it is determined whether communication with the receiving powerline communication device 116 is possible. For example, the powerline channel selection unit 108 of the transmitting powerline communication device 102 can determine whether a communication link between the transmitting powerline communication device 102 and the receiving powerline communication device 116 can be established. In some implementations, communication with the receiving powerline communication device 116 may not be possible if the receiving powerline communication device 116 cannot be identified (e.g., if the receiving powerline communication device 116 was disconnected from the powerline communication network, etc.), if an acknowledgment/response message is not received from the receiving powerline communication device 116, etc.

Furthermore, in some implementations, the transmitting powerline communication device 102 and the receiving powerline communication device 116 may support a different subset of powerline communication channels to implement the smart coupler configuration 250. For example, the transmitting powerline communication device 102 may support the powerline communication channels that comprise the N-G connection and may attempt to analyze one such powerline communication channel. If the receiving powerline communication device 116 does not support the N-G connection, a communication link between the transmitting powerline communication device 102 and the receiving powerline communication device 116 may not be established. In some implementations, as part of the process of establishing the communication link, the transmitting powerline communication device 102 and the receiving powerline communication device 116 can indicate whether they support the optimal coupler configuration 200 or the smart coupler configuration 250. This can help speed up the process for testing the powerline communication channels and for selecting a preferred powerline communication channel. For example, if the transmitting powerline communication device 102 supports the optimal coupler configuration 200 and the receiving powerline communication device 116 supports the smart coupler configuration 250, the transmitting powerline communication device 102 may only analyze the subset of the powerline communication channels that are supported by the receiving powerline communication device 116. If it is determined that communication with the receiving powerline communication device 116 is possible, the flow continues at block 304 where the transmitting powerline communication device 102 can determine performance measurements associated with the powerline communication channel, as will be described below. Otherwise, the flow continues at block 305.

At block 305, it is determined whether the powerline communication channel is the default communication channel. For example, the powerline channel selection unit 108 of the transmitting powerline communication device 102 can determine whether the communication link with the receiving powerline communication device 116 could not be established on the default powerline communication channel. If the communication link could not be established on the default powerline communication channel, subsequent operations described herein may not be executed and the powerline channel selection unit 108 may indicate that communication with the receiving powerline communication device 116 is not possible. If it is determined that the communication link could not be established on the default powerline communication channel, the flow ends. Otherwise, the flow continues at block 310, where a next powerline communication channel is identified and analyzed.

At block 304, the powerline communication channel is sounded. For example, the channel estimation unit 110 of the transmitting powerline communication device 102 can sound the powerline communication channel. The flow 300 moves from block 303 to block 304 on determining that the communication link between the transmitting powerline communication device 102 and the receiving powerline communication device 116 was established. The channel estimation unit 110 can transmit a sounding request message to the receiving powerline communication device 116. As described above, the transmitted sounding request message and a corresponding received sounding response message can enable the channel estimation unit 110 to determine performance measurements associated with the powerline communication channel. The flow continues at block 306.

At block 306, it is determined whether performance measurements associated with the powerline communication channel are available. In one example, the powerline channel selection unit 108 of the transmitting powerline communication device 102 can determine whether the performance measurements associated with the powerline communication channel were received from the receiving powerline communication device 116. The powerline channel selection unit 108 can determine whether an acknowledgement message was received from the receiving powerline communication device 116 and/or whether the sounding response message comprising the performance measurements were received from the receiving powerline communication device 116. The powerline channel selection unit 108 may wait for a predetermined time interval to receive the performance measurements. In some implementations, the channel estimation unit 110 can re-sound the powerline communication channel after the predetermined time interval elapses (e.g., by decreasing the data transmit rate, increasing the FEC rate, etc.). The powerline channel selection unit 108 may deem the powerline communication channel to be incapable of supporting communication between the transmitting powerline communication device 102 and the receiving communication device 116 if the performance measurements associated with the powerline communication channel cannot be determined. If it is determined that the performance measurements associated with the powerline communication channel are available, the flow continues at block 308 where an indication of the powerline communication channel are stored. Otherwise, the indication of the powerline communication channel is not stored and the flow continues at block 310 in FIG. 4.

At block 308, the performance measurements associated with the powerline communication channel are stored in a candidate channel data structure. For example, the powerline channel selection unit 108 can store the performance measurements (e.g., SNR, BER, tone maps, etc.) associated with the powerline communication channel in the candidate channel data structure. In some implementations, the performance measurements may be received via the default powerline communication channel (e.g., the L-N connection and the open ground configuration). In another implementation, the performance measurements may be received on a last analyzed powerline communication channel for which associated performance measurements were stored in the candidate channel data structure. In another implementation, the performance measurements may be received via the powerline communication channel that is currently being analyzed. Knowledge of the performance measurements associated with each of the powerline communication channels that are analyzed can enable the powerline channel selection unit 108 to select a best performing powerline communication channel, as will be described below with reference to FIG. 4. The flow continues at block 310 in FIG. 4.

At block 310, it is determined whether additional powerline communication channels are to be analyzed. For example, the powerline channel selection unit 108 can access an internal channel list to determine whether additional powerline communication channels are to be analyzed. For the optimal coupler configuration 200 of FIG. 2A, the internal channel list can comprise powerline communication channels represented by all possible combinations of terminal connections at the transmitting powerline communication device 102, terminal connections at the receiving powerline communication device 116, and grounding configurations. For the smart coupler configuration 250 of FIG. 2A, the internal channel list can comprise a predefined subset of the powerline communication channels. If the powerline channel selection unit 108 determines that additional powerline communication channels are to be analyzed, the flow continues at block 312. Otherwise, the flow continues at block 316.

At block 312, the next powerline communication channel to be analyzed is identified and an indication of the next powerline communication channel is provided to the receiving network device. For example, the powerline channel selection unit 108 can identify the next powerline communication channel to be analyzed from the internal channel list. In another implementation, as described above, the internal channel list can comprise a flag to indicate, e.g., in a smart coupler configuration, whether or not a particular powerline communication channel is to be analyzed. The internal channel list can also indicate an order in which the powerline communication channels are to be analyzed. Typically, the powerline communication channels can be ordered in the internal channel list so that the transmitting powerline device 102 and the receiving powerline communication device 116 can switch one from powerline communication channel to the next with minimum changes to the powerline circuitry terminal connections (e.g., minimal switching between powerline terminal connections).

The powerline channel selection unit 108 can then cause the transmitter processing unit 104 to transmit a message indicating the next powerline communication channel that will be analyzed to the receiving powerline communication device 116. In some implementations, the indication of the next powerline communication channel can be transmitted on the default powerline communication channel (e.g., the L-N connection and the open ground configuration). In another implementation, the indication of the next powerline communication channel can be transmitted on a last available powerline communication channel. In one example, the last available communication channel can be identified as a last analyzed powerline communication channel for which associated performance measurements were stored in the candidate channel data structure. In another example, the last available communication channel can be identified as a last analyzed powerline communication channel that is associated with performance measurements that meet the performance thresholds. In another example, the last available communication channel can be identified as a last powerline communication channel for which associated performance measurements were received from the receiving powerline communication device 116.

In some implementations, the transmitting powerline communication device 102 and the receiving powerline communication device 116 can store the same version of the internal channel list. The indication of the next powerline communication channel can be transmitted as an index (determined from the internal channel list) that corresponds to the next powerline communication channel to be analyzed. In another implementation, the indication of the next powerline communication channel can be transmitted by setting a flag in a message to indicate that the receiving powerline communication device 116 should switch to the next powerline communication channel. The receiving powerline communication device 116 can, in turn, access its internal channel list, identify the next powerline communication channel, and cause the powerline network coupling device 120 of the receiving powerline communication device 116 to switch to the next powerline communication channel. In another implementation, the indication of the next powerline communication channel can be transmitted in a message that explicitly identifies terminal connections that represent the next powerline communication channel. The flow continues at block 314.

At block 314, the transmitting powerline communication device switches to the next powerline communication channel to be analyzed. For example, the powerline channel selection unit 108 can cause the powerline network coupling device 106 to switch to the next powerline communication channel identified at block 312. The flow then loops back to block 303 in FIG. 3, where the next powerline channel is sounded and operations for determining and storing the performance measurements associated with the next powerline communication channel, as described with reference to blocks 303-314 are executed for the next powerline communication channel. After all the powerline communication channels identified in the internal channel list are analyzed, the flow continues at block 316.

At block 316, it is determined whether the candidate channel data structure is empty. The flow 300 moves from block 310 to block 316 if the powerline channel selection unit 108 determines that all the powerline communication channels in the internal channel list have been analyzed. The candidate channel data structure may be empty if performance measurements associated with none of the powerline communication channels were received from the receiving powerline communication device 116. The candidate channel data structure may be empty if the transmitting powerline communication device 102 could not establish a communication link with the receiving powerline communication device 116 on any of the powerline communication channels. If it is determined that the candidate channel data structure is empty, the flow continues at block 318. Otherwise, the flow continues at block 320.

At block 318, it is determined that the transmitting network device is unable to communicate via any powerline communication channel. For example, the powerline channel selection unit 108 can determine that the transmitting network device 102 is unable to communicate via any powerline communication channel in response to determining that the candidate channel data structure is empty. From block 318, the flow ends.

At block 320, a powerline communication channel with the best performance measurements ("preferred powerline communication channel") is selected from the candidate channel data structure. For example, the channel parameters comparison unit 112 can select the preferred powerline communication channel based on the collected performance measurements. In one implementation, the channel parameters comparison unit 112 can determine a score associated with each powerline communication channel in the candidate channel data structure based on a weighted combination of the performance measurements (e.g., BER, data transmit rate, SNR, throughput, etc.) associated with corresponding each of the powerline communication channels. The channel parameters comparison unit 112 can select the powerline communication channel associated with the highest score. In another implementation, the channel parameters comparison unit 112 can select the preferred powerline communication channel based on the tone maps, associated with each of the powerline communication channels, received from the receiving powerline communication device 116. The flow continues at block 322.

At block 322, an indication of the preferred powerline communication channel is communicated to the receiving network device. For example, the powerline channel selection unit 108 can communicate the indication of the preferred powerline communication channel to the receiving powerline communication device 116. In one implementation, the powerline channel selection unit 108 can communicate the index (determined from the internal channel list) that corresponds to the preferred powerline communication channel. In another implementation, the powerline channel selection unit 108 can explicitly indicate the preferred powerline communication channel to the receiving powerline communication device 116. In one implementation, the powerline channel selection unit 108 can communicate the indication of the preferred powerline communication channel on the last available powerline communication channel (i.e., the last powerline communication channel that was stored in the candidate channel data structure). In another implementation, the powerline channel selection unit 108 can communicate the indication of the preferred powerline communication channel on the default powerline communication channel. Additionally, the powerline channel selection unit 108 can communicate the indication of the preferred powerline communication channel to the powerline network coupling unit 106 to cause the powerline network coupling unit 106 to switch to the preferred powerline communication channel. The flow continues at block 324.

At block 324, subsequent packets are transmitted to the receiving network device via the preferred powerline communication channel. As will be described in FIG. 6, if the preferred powerline communication channel is not the default powerline communication channel, the data packets can be transmitted via the preferred powerline communication channels while the overhead packets (e.g., acknowledgement messages, RTS/CTS messages, etc.) can be transmitted/received via the default powerline communication channel. From block 324, the flow ends.

Although FIG. 3 depicts the powerline channel selection unit 108 storing the performance measurements associated with the each powerline communication channel for which the performance measurements are available (described at block 306), embodiments are not so limited. In other embodiments, the channel parameters comparison unit 112 may analyze the performance measurements associated with the powerline communication channel prior to storing the performance measurements. The channel parameters comparison unit 112 may compare the performance measurements associated with the powerline communication channel against performance thresholds. For example, the channel parameters comparison unit 112 may compare the calculated signal-to-noise ratio and the calculated bit error rate against a threshold signal-to-noise ratio and a threshold bit error rate, respectively. The channel parameters comparison unit 112 may store the performance measurements associated with the powerline communication channel in the candidate channel data structure if the performance measurements meet the performance thresholds. After all the powerline communication channels are analyzed, the channel parameters comparison unit 112 can traverse the candidate channel data structure and identify the best of the powerline communication channels that satisfied the performance thresholds.

Figure 5:
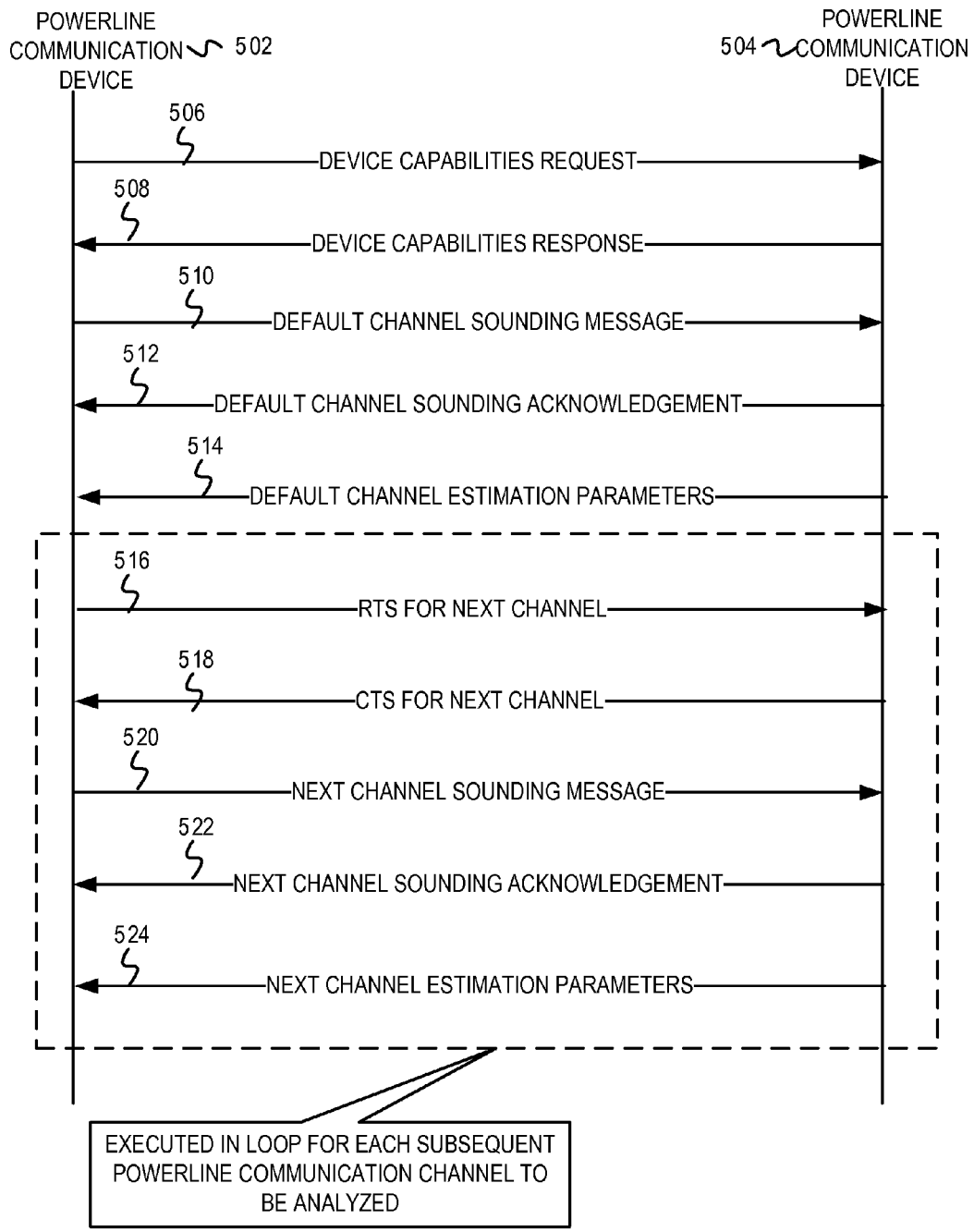
FIG. 5 is a sequence diagram illustrating example operations for selecting a preferred powerline communication channel.

FIG. 5 is a sequence diagram illustrating example operations for selecting a preferred powerline communication channel. FIG. 5 depicts powerline communication devices 502 and 504. Before the powerline communication device 502 can transmit data messages to the powerline communication device 504, the powerline communication device 502 analyses multiple powerline communication channels to identify the preferred powerline communication channel, as described above with reference to FIGS. 1-4. The powerline communication device 502 transmits a device capabilities request message 506 to interrogate the powerline communication device 504 and to ascertain the capabilities of the powerline communication device 504. The device capabilities request message 506 can indicate data rates, modulation schemes, and other capabilities of the powerline communication device 502. The device capabilities request message 506 can also be used to determine whether the powerline communication device 504 supports the optimal coupler configuration 200 or the smart coupler configuration 250. In response, the powerline communication device 504 transmits a device capabilities response message 508 to indicate that the powerline communication device 504 supports the same capabilities as the powerline communication device 502. It is noted that if the device capabilities response message 508 indicates that the powerline communication device 504 does not support either the optimal coupler configuration 200 or the smart coupler configuration 250, the powerline communication device 502 can communicate with the powerline communication device 504 via a default powerline communication channel. The powerline communication device 502 transmits a channel sounding message 510 along the default powerline communication channel. In one example, the powerline communication device 502 and the powerline communication device 504 can each initialize communication on the default powerline communication channel by establishing the default L-N connection and the open ground configuration. In response to the channel sounding message 512, the powerline communication device 504 transmits, along the default powerline communication channel, a channel sounding acknowledgement message 512 and channel estimation parameters 514 associated with the default powerline communication channel.

As described above, the powerline communication device 502 receives and stores the channel estimation parameters 514 associated with the default communication channel. The powerline communication device 502 also identifies and indicates a next powerline communication channel to be analyzed. The powerline communication device 502 transmits a request-to-send (RTS) message 516 to the powerline communication device 504 identifying the next powerline communication channel to be analyzed. In response, the powerline communication device 504 transmits a clear-to-send (CTS) message 518 to the powerline communication device 502. The RTS/CTS sequence can comprise an indication of the current powerline communication channel to be analyzed. The powerline communication device 502 can use previously unused bit in the RTS message 516 to indicate the powerline communication channel that is to be analyzed. The powerline communication device 502 can transmit the RTS/CTS sequence to precede the sounding message that will be transmitted using the each non-default powerline communication channel. Transmission of the RTS/CTS sequence can enable the powerline communication device 504 to precondition its coupling circuitry in preparation for the receipt of the sounding message and can enable the powerline communication device 504 to execute automatic gain control (AGC), syncing, correlation, and other operations on the appropriate powerline communication channel. Following receipt of the CTS message 518, the powerline communication device 502 transmits a channel sounding message 520 along the powerline communication channel. In response, the powerline communication device 504 transmits (either along the same powerline communication channel or along the default powerline communication channel), a channel sounding acknowledgement message 522 and channel estimation parameters 524 associated with the powerline communication channel. The powerline communication device 502 can receive and store the channel estimation parameters 524 associated with the powerline communication channel.

These set of operations are executed in a loop for each subsequent powerline communication channel to be analyzed. For example, the powerline communication device 502 can direct, via the default communication channel, the powerline communication device 504 to switch to the next powerline communication channel. For example, the powerline communication device 502 can direct the powerline communication device 504 to switch to the powerline communication channel represented by the L-G connection and the open ground configuration. The unused terminal (in this case the neutral terminal) is typically left unconnected. As described above, after all the powerline communication channels identified by the internal channel list are analyzed, the powerline communication device 502 can select the preferred powerline communication channel with the best performance measurement, notify the powerline communication device 504 of the preferred powerline communication channel, can transmit subsequent data messages via the preferred powerline communication channel.

Figure 6:
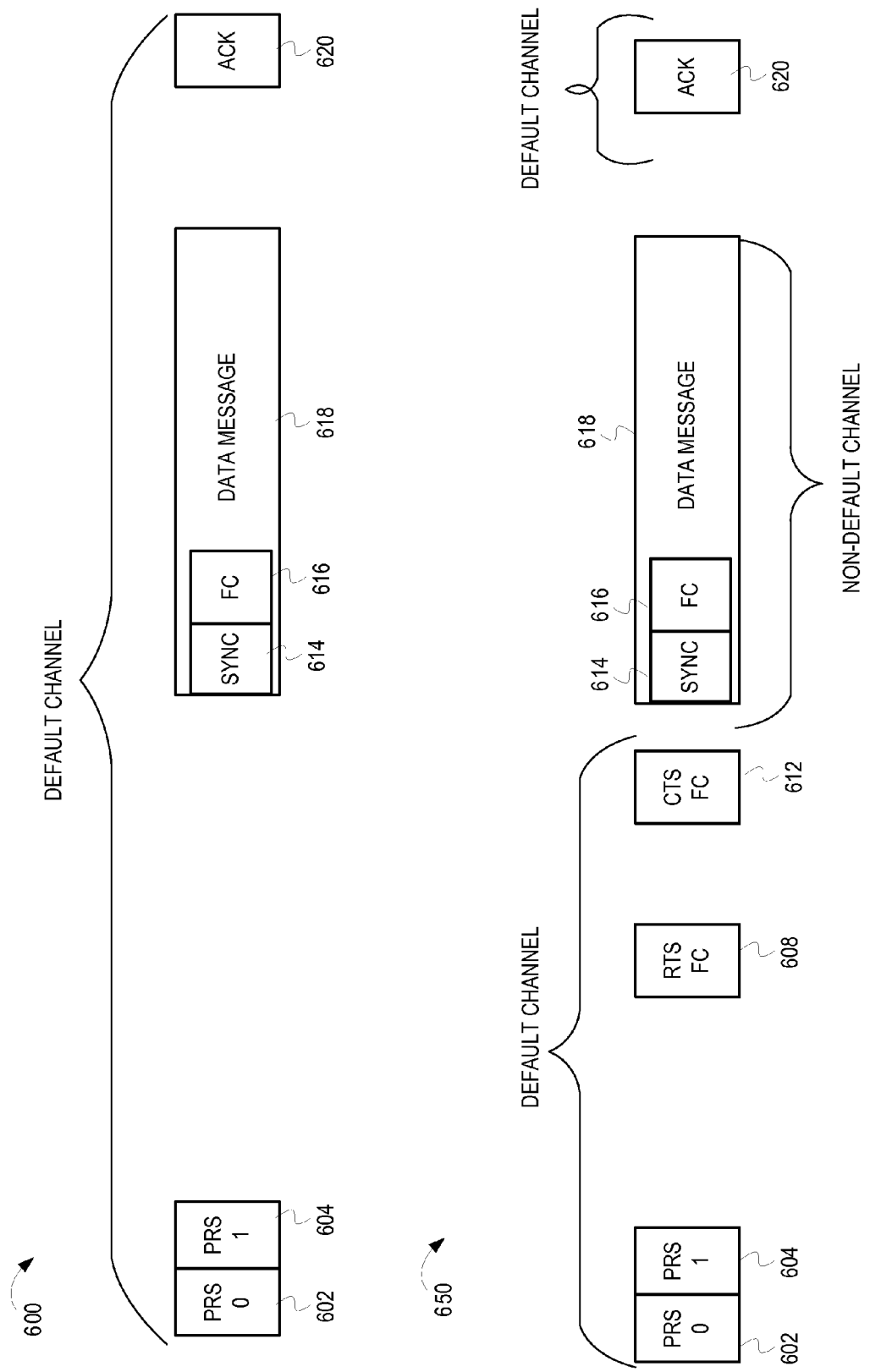
FIG. 6 illustrates an example transmission protocol for default and non-default powerline communication channels.

FIG. 6 illustrates an example transmission protocol for default and non-default powerline communication channels. As depicted by the transmission protocol 600 for the default powerline communication channel, prior to transmitting data packets or the sounding message, the transmitting powerline communication device 102 of FIG. 1 can transmit phase reference symbols (PRS) 602 and 604. The PRS 602 and 604 comprise a known modulated sequence to enable the receiving powerline communication device 116 to identify and correct for any phase errors and inconsistencies on the powerline communication channel. The transmitting powerline communication device 102 can transmit the data message 618 including a sync symbol 614, a frame control symbol 616, etc. via the default powerline communication channel. The data message 618 can be a sounding message, a message comprising application data, etc. Finally, the transmitting powerline communication device 102 can receive an acknowledgement (ACK) message 620 from the receiving powerline communication device 116 via the default powerline communication channel. Thus, as depicted by the transmission protocol 600 for the default powerline communication channel, when the default powerline communication channel is being analyzed or when the default powerline communication channel is selected as the preferred powerline communication channel for subsequent communication, all overhead messages (e.g., the PRS 602 and 604, the ACK message 620, etc.) and data messages 618 may be transmitted via the default powerline communication channel.

As depicted by the transmission protocol 650 for the non-default powerline communication channel, prior to transmitting the data message 618, the transmitting powerline communication device 102 can transmit the PRS 602 and 604 via the default powerline communication channel. The transmitting powerline communication device 102 can also transmit an RTS message 608 via the default powerline communication channel and can receive a CTS message 612 via the default powerline communication channel. After receiving the CTS message 612, the transmitting powerline communication device 102 can transmit the data message 618 including the sync symbol 614, the frame control symbol 616, etc. via the selected non-default powerline communication channel. Finally, the transmitting powerline communication device 102 can switch back to the default powerline communication channel to receive the ACK message 620 from the receiving powerline communication device 116. Thus, as depicted by the transmission protocol 650, when the non-default powerline communication channel is being analyzed or when the non-default powerline communication channel is selected as the preferred powerline communication channel, all overhead messages (e.g., the PRS 602 and 604, the RTS message 608, the CTS message 612, the ACK message 620, etc.) may be exchanged via default powerline communication channel and the data messages 618 may be transmitted via the non-default powerline communication channel. Furthermore, although not depicted in FIG. 6, the RTS message 608 and the CTS message 612 can comprise duration fields that indicate the time between the end of the RTS message 608 or CTS message 612 and the end of the ACK message 620. The frame control field 616 of the data message 618 can comprise a frame length field that indicates the time between the end of the frame control field 616 and the end of the ACK message 620. This can enable other powerline communication devices to be aware of the end of the ACK message 620 and to consequently being contention for the powerline communication channel.

It should be understood that the depicted diagrams (FIGS. 1-6) are examples meant to aid in understanding embodiments and should not be used to limit embodiments or limit scope of the claims. Embodiments may perform additional operations, fewer operations, operations in a different order, operations in parallel, and some operations differently. For instance, although the examples described above use the L-N connection with the open ground configuration as the default powerline communication channel for initializing communications, for gathering the performance measurements associated with non-default powerline communication channels, and for indicating the best performing powerline communication channel, embodiments are not so limited. In other embodiments, communications may be initialized using other suitable terminal connection options (e.g., the L-G connection) as the default powerline communication channel. For example, the default powerline communication channel can be selected based on the network negotiations or based on geographic requirements. In some cases, the L-N connection can be selected as the default powerline communication channel because it is ubiquitous and provides support for legacy powerline communication devices. In some embodiments, the powerline channel selection unit 108 of the transmitting powerline communication device 102 and the powerline channel selection unit 122 of the receiving powerline communication device 102 can be implemented (at least partially) in the media access controller (MAC) of the respective powerline communication device.

It is noted that although FIGS. 1-6 describe the transmitting powerline communication device 102 determining the preferred powerline communication channel and transmitting subsequent data packets along the preferred powerline communication channel, embodiments are not so limited. Each powerline communication device can execute the operations described herein for analyzing the powerline communication channels and for identifying their respective preferred powerline communication channel. Thus, because of asymmetry in the powerline communication medium 114, the transmitting powerline communication device 102 could transmit data packets to the receiving powerline communication device 116 on a first powerline communication channel and could receive data packets from receiving powerline communication device 116 via a second, distinct powerline communication channel. For example, the transmitting powerline communication device 102 can determine that the powerline communication channel represented by the L-N connection at the transmitting and the receiving powerline communication devices and an open ground configuration is the preferred powerline communication channel. The receiving powerline communication device 116 can determine that the powerline communication channel represented by the N-G connection at the transmitting powerline communication device, the L-G connection at the receiving powerline communication device, and the ground to earth configuration is the preferred powerline communication channel. Moreover, each powerline communication device can select a preferred powerline communication channel for each device that it communications with. Each powerline communication device can establish its own best communication condition, exploit possible powerline communication medium asymmetry, and select the best powerline communication channel for communicating with another powerline communication device.

Furthermore, FIGS. 1-6 describe operations for initial sounding/channel estimation and for selecting a preferred powerline communication channel for subsequent data transfer, embodiments are not so limited. After the preferred powerline communication channel is selected, the powerline communication devices (e.g., the transmitting powerline communication device 102) can continue to determine and monitor performance measurements associated with the preferred powerline communication channel. In some implementations, the powerline communication devices can be configured to execute the operations described herein either periodically (e.g., based on a predefined timeout) or in response to a performance-based trigger (e.g., a predefined change in throughput). For example, the transmitting powerline communication device 102 can determine whether and how often the transmitting powerline communication device 102 has retransmitted packets. As another example, the transmitting powerline communication device 102 can determine a transmission time and a retransmission time (if applicable). As another example, the transmitting powerline communication device 102 can monitor the SNR, the BER, the data transmit rate, and the throughput of the preferred powerline communication channel. The transmitting powerline communication device 102 can periodically resound all the powerline communication channels (in the case of the optimal coupler configuration 200) or a predetermined subset of the powerline communication channels (in the case of the smart coupler configuration 250). The transmitting powerline communication device 102 can determine whether the throughput of the current powerline communication channel has deteriorated as compared to another powerline communication channel, or whether another powerline communication device has improved relative to the current powerline communication channel. If the performance of another powerline communication channel is deemed to be better than the current powerline communication channel, the transmitting powerline communication device 102 can direct the receiving powerline communication device 116 to switch to a new preferred powerline communication channel.

It is also noted that in a multi-cast communication, the transmitting powerline communication device 102 can broadcast multi-cast packets to multiple receiving powerline communication devices via the default powerline communication channel. In some implementations, each of the multiple receiving powerline communication devices can respond to the transmitting powerline communication device via the default communication channel. In another implementation, each of the multiple receiving powerline communication devices can select their respective preferred powerline communication channel (as described above in FIGS. 1-6) and can respond to the transmitting powerline communication device via their respective preferred powerline communication channel.

It is noted that if the preferred powerline communication channel is not the default powerline communication channel, the transmitter processing unit 104 can transmit the RTS message, and wait to receive the CTS message prior to transmitting the data packets to the receiving powerline communication device 116. The process of exchanging the RTS/CTS messages prior to transmitting the data packets can be executed for all tone-mapped transmissions. However, ROBust OFDM (ROBO) transmissions and multi-cast transmissions can be transmitted via the default powerline communication channel. The RTS/CTS messages need not be exchanged with the receiving powerline communication channel prior to transmitting the data packets via the default powerline communication channel. Although examples refers to the transmitting powerline communication device 102 exchanging RTS/CTS messages with the receiving powerline communication device 116 prior to transmitting data messages via the non-default powerline communication channel, embodiments are not limited to the exchange of RTS/CTS messages. For example, in a time division multiple access (TDMA) based network, the operations described herein can be predetermined for specific transmit slots for a pair of powerline communication devices. As another example, only a CTS message may be transmitted prior to transmitting the data messages via the non-default powerline communication channel.

Lastly, it is noted that FIGS. 1-6 describe the powerline communication devices switching from one powerline communication channel to another powerline communication channel by varying the grounding configuration (e.g., switching between the open ground configuration and the ground to earth configuration and vice versa). However, in some implementations, the grounding option may not be configurable. In some implementations, the ground terminals of the powerline circuitry (e.g., powerline sockets) and/or the ground terminal of the powerline communication devices may be preconfigured and may not be adjustable. In some implementations, the powerline communication devices may step through and analyze all the powerline communication channels indicated by the internal channel list irrespective of whether consecutive powerline communication channels differ from each other only in the grounding configuration. In another implementation, the powerline communication devices may have the ability to determine that the grounding configuration is not alterable. In this scenario, the powerline communication devices may analyze a particular terminal connection only once. For example, instead of evaluating the powerline communication channel represented by the L-G connection twice—once in the open ground configuration and again in the ground to earth configuration, the powerline communication device can evaluate the powerline communication channel represented by the L-G connection once without taking the grounding configuration into consideration.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
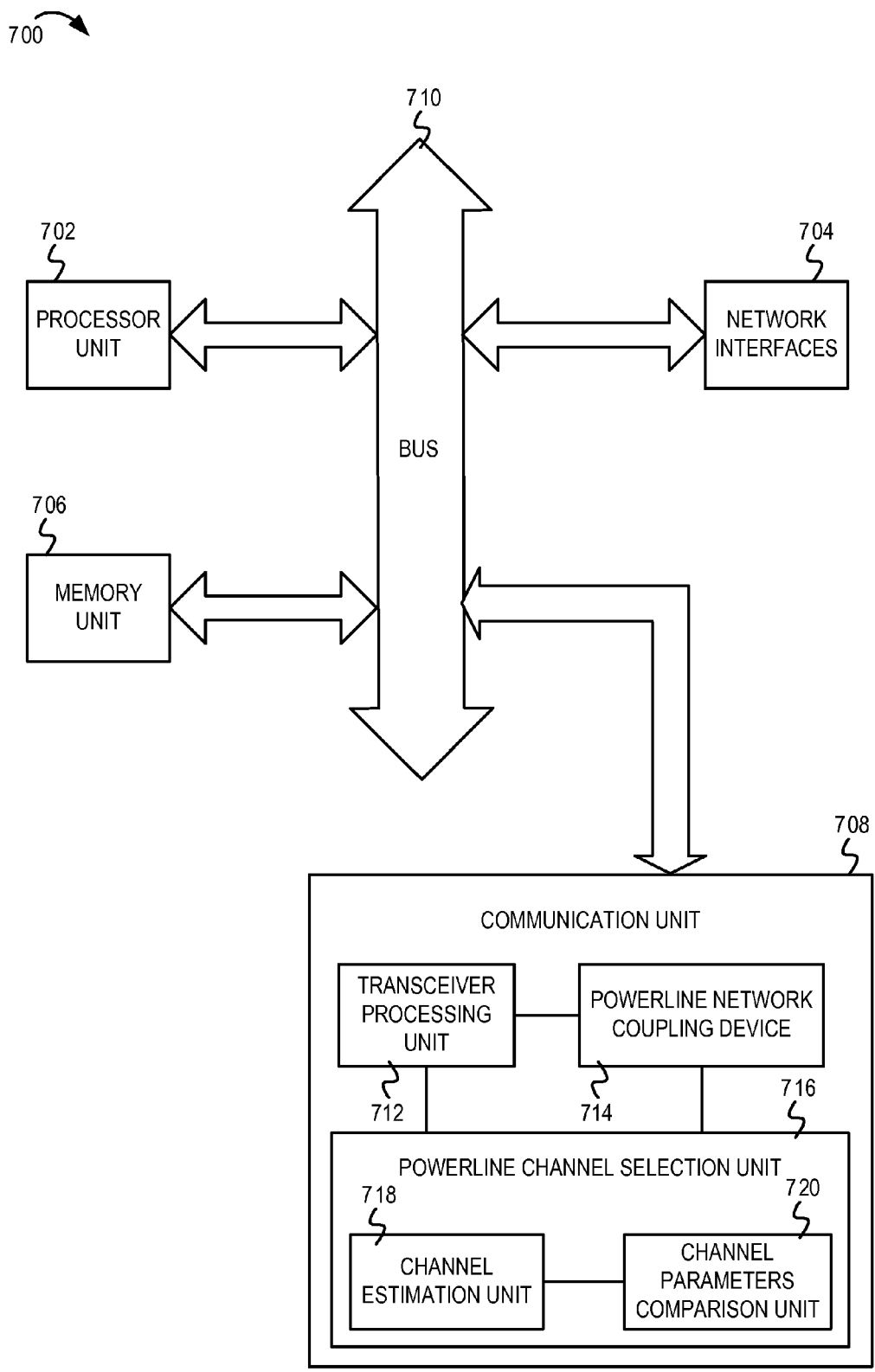
FIG. 7 is a block diagram of one embodiment of an electronic device including a mechanism for terminal selection diversity for powerline communications.

FIG. 7 is a block diagram of one embodiment of an electronic device 700 including a mechanism for terminal selection diversity for powerline communications. In some implementations, the electronic device 700 may be a personal computer (PC), a laptop, a netbook, a mobile phone, a personal digital assistant (PDA), a smart appliance, or other electronic systems configured to communicate across a powerline communication network. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, InfiniBand®, NuBus, AHB, AXI, etc.), and network interfaces 704 that include one or more of a wired network interface (e.g., a powerline communication interface) and a wireless network interface (e.g., a WLAN interface, a Bluetooth® interface, a WiMAX interface, a ZigBee® interface, a Wireless USB interface, etc.).

The electronic device 700 also comprises a communication unit 708. The communication unit 708 comprises a transceiver processing unit 712 coupled to a powerline network coupling device 714 and a powerline channel selection unit 716. Additionally, the transceiver processing unit 712 is also coupled to the powerline network coupling device 714. The powerline channel selection unit 716 comprises a channel estimation unit 718 coupled to a channel parameters comparison unit 720. The communication unit 708 can implement functionality to select the preferred powerline communication channel with the best performance measurements to maximize data throughput from a transmitter to a receiver. The powerline communication channel can be represented as a combination of a grounding configuration, a transmitter terminal connection to corresponding powerline network circuitry, and a receiver terminal connection to corresponding powerline network circuitry. The communication unit 708 can analyze one or more powerline communication channels, determine performance measurements associated with the one or more powerline communication channels, and select the preferred powerline communication channel for subsequent communication, as described with reference to FIGS. 1-6.

In some embodiments, the communication unit 708 may include two or more wired or wireless communication devices in the same integrated circuit (e.g., a system-on-a-chip) or in the same circuit board within the electronic device 700. For example, the communication unit 708 can include a powerline device, a WLAN device, and/or a Bluetooth device. Furthermore, one or more components of the communication unit 708 can be implemented on a common chip or integrated circuit, on separate chips and then coupled together, etc. Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, and the network interfaces 706 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, techniques for terminal selection diversity for powerline communications as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a first network device of a powerline communication network, to establish communications with a second network device of the powerline communication network;
   periodically determining, at the first network device, performance measurements associated with each of a plurality of powerline communication channels associated with the powerline communication network for communicating with the second network device;
   determining, at the first network device, a preferred powerline communication channel from the plurality of powerline communication channels based on said periodically determining the performance measurements;
   providing an indication of the preferred powerline communication channel from the first network device to the second network device to cause a terminal connection at the second network device to be changed to the preferred powerline communication channel;
   changing a terminal connection at the first network device to the preferred powerline communication channel; and
   initiating communications from the first network device to the second network device via the preferred powerline communication channel.

2. The method of claim 1, wherein said determining, at the first network device, the performance measurements associated with each of the plurality of powerline communication channels associated with the powerline communication network comprises:
for each of the plurality of powerline communication channels associated with the powerline communication network for communicating with the second network device,
notifying the second network device to change the terminal connection at the second network device in accordance with the powerline communication channel selected by the first network device;
transmitting a sounding request message to the second network device via the powerline communication channel; and
receiving, from the second network device, a sounding response message that indicates at least a subset of the performance measurements associated with the powerline communication channel.

3. The method of claim 2, further comprising:
for each of the plurality of powerline communication channels associated with the powerline communication network for communicating with the second network device,
storing, in a candidate channel data structure at the first network device, the performance measurements associated with the powerline communication channel and an indication of the powerline communication channel.

4. The method of claim 3, further comprising:
in response to determining that the plurality of the powerline communication channels have been analyzed, determining whether the candidate channel data structure at the first network device is empty;
determining an inability to communicate with the second network device in response to determining that the candidate channel data structure at the first network device is empty; and
determining, at the first network device, the preferred powerline communication channel based on the performance measurements in response to determining that the candidate channel data structure at the first network device is not empty.

5. The method of claim 1, wherein the plurality of powerline communication channels associated with the powerline communication network comprises all combinations of the terminal connection at the first network device, the terminal connection at the second network device and a grounding configuration, wherein the grounding configuration comprises an open ground configuration or a ground to earth configuration.

6. The method of claim 1, wherein the plurality of powerline communication channels associated with the powerline communication network comprises a subset of combinations of the terminal connection at the first network device, the terminal connection at the second network device and a grounding configuration, wherein the grounding configuration comprises an open ground configuration or a ground to earth configuration.

7. The method of claim 1, wherein the performance measurements associated with a powerline communication channel comprise at least one of a signal to noise ratio of the powerline communication channel, a bit error rate of the powerline communication channel, a data transmit rate, a throughput of the powerline communication channel, a transmission time duration, and a tone map associated with the powerline communication channel.

8. The method of claim 1, wherein said determining the preferred powerline communication channel from the plurality of powerline communication channels based on the performance measurements comprises:
determining a performance metric for each of the plurality of powerline communication channels as a combination of the performance measurements associated with corresponding each of the plurality of powerline communication channels;
comparing the performance metric for each of the plurality of powerline communication channels; and
selecting the preferred powerline communication channel from the plurality of powerline communication channels based on said comparing the performance metric for each of the plurality of powerline communication channels.

9. The method of claim 1, wherein said providing the indication of the preferred powerline communication channel from the first network device to the second network device comprises one or more of:
transmitting, from the first network device, a message to the second network device that indicates the preferred powerline communication channel, and
transmitting, from the first network device to the second network device, an index of an internal powerline communication channel list that corresponds to the preferred powerline communication channel.

10. The method of claim 1, wherein said changing the terminal connection at the first network device to the preferred powerline communication channel comprises providing a control signal to cause a network coupling device of the first network device to change the terminal connection at the first network device.

11. The method of claim 10, wherein the terminal connection at the first network device represents a coupling of at least two powerline terminals associated with a powerline socket, wherein the powerline terminals comprise a line terminal, a neutral terminal, and a ground terminal.

12. The method of claim 1, after determining that a first channel of the plurality of powerline communication channels is the preferred powerline communication channel, the method further comprises:
determining, at the first network device, that a second channel of the plurality of powerline communication channels is the preferred powerline communication channel based on said periodically determining the performance measurements;
providing an indication of the second channel of the plurality of powerline communication channels from the first network device to the second network device to cause the second network device to change the terminal connection to the second channel of the plurality of powerline communication channels;
changing the terminal connection at the first network device to the second channel of the plurality of powerline communication channels; and
initiating subsequent communications from the first network device to the second network device via the second channel of the plurality of powerline communication channels.

13. A method comprising:
determining, at a first network device of a powerline communication network, to establish communications with a second network device of the powerline communication network;
determining, at the first network device, performance measurements associated with each of a plurality of powerline communication channels associated with the powerline communication network for communicating with the second network device;

for each of the plurality of powerline communication,
determining, at the first network device, whether the performance measurements associated with the powerline communication channel satisfy predefined performance thresholds;
storing, in a candidate channel data structure at the first network device, the performance measurements associated with the powerline communication channel and an indication of the powerline communication channel in response to determining that the performance measurements associated with the powerline communication channel satisfy the predefined performance thresholds; and
discarding the performance measurements associated with the powerline communication channel in response to determining that the performance measurements associated with the powerline communication channel do not satisfy the predefined performance thresholds;

determining, at the first network device, a preferred powerline communication channel based, at least in part, on determining whether the performance measurements associated with one or more of the plurality of powerline communication channels satisfy the predefined performance thresholds;

providing an indication of the preferred powerline communication channel from the first network device to the second network device to cause a terminal connection at the second network device to be changed to the preferred powerline communication channel;

changing a terminal connection at the first network device to the preferred powerline communication channel; and initiating communications from the first network device to the second network device via the preferred powerline communication channel.

14. A network device comprising:
a powerline channel selection unit operable to:
periodically determine performance measurements associated with each of a plurality of powerline communication channels associated with a powerline communication network for communicating with a second network device of the powerline communication network;
determine a preferred powerline communication channel from the plurality of powerline communication channels based on the powerline channel selection unit periodically determining the performance measurements;
provide an indication of the preferred powerline communication channel to the second network device to cause a terminal connection at the second network device to be changed to the preferred powerline communication channel;
a powerline network coupling device operable to:
change a terminal connection at the network device to the preferred powerline communication channel in response to the powerline channel selection unit determining the preferred powerline communication channel from the plurality of powerline communication channels based on the performance measurements; and
a transceiver unit operable to:
initiate communications from the network device to the second network device via the preferred powerline communication channel.

15. The network device of claim 14, wherein the powerline channel selection unit operable to determine the performance measurements associated with each of the plurality of powerline communication channels associated with the powerline communication network comprises the powerline channel selection unit operable to:
for each of the plurality of powerline communication channels associated with the powerline communication network for communicating with the second network device,
notify the second network device to change the terminal connection at the second network device in accordance with the powerline communication channel selected by the network device;
transmit a sounding request message to the second network device via the powerline communication channel; and
receive, from the second network device, a sounding response message that indicates at least a subset of the performance measurements associated with the powerline communication channel.

16. The network device of claim 15, wherein the powerline channel selection unit is further operable to:
for each of the plurality of powerline communication channels associated with the powerline communication network for communicating with the second network device,
store, in a candidate channel data structure at the network device, the performance measurements associated with the powerline communication channel and an indication of the powerline communication channel.

17. The network device of claim 16, wherein the powerline channel selection unit is further operable to:
in response to determining that the plurality of the powerline communication channels have been analyzed, determine whether the candidate channel data structure at the network device is empty;
determine an inability to communicate with the second network device in response to determining that the candidate channel data structure at the network device is empty; and
determine the preferred powerline communication channel based on the performance measurements in response to determining that the candidate channel data structure at the network device is not empty.

18. The network device of claim 14, wherein the performance measurements associated with a powerline communication channel comprise at least one of a signal to noise ratio of the powerline communication channel, a bit error rate of the powerline communication channel, a data transmit rate, a throughput of the powerline communication channel, a transmission time duration, and a tone map associated with the powerline communication channel.

19. The network device of claim 14, wherein the powerline channel selection unit operable to determine the preferred powerline communication channel from the plurality of powerline communication channels based on the performance measurements comprises the powerline channel selection unit operable to:
determine a performance metric for each of the plurality of powerline communication channels as a combination of the performance measurements associated with corresponding each of the plurality of powerline communication channels;
compare the performance metric for each of the plurality of powerline communication channels; and
select the preferred powerline communication channel from the plurality of powerline communication channels based on said comparing the performance metric for each of the plurality of powerline communication channels.

20. The network device of claim 14, after determining that a first channel of the plurality of powerline communication channels is the preferred powerline communication channel, the powerline channel selection unit is further operable to:
determine that a second channel of the plurality of powerline communication channels is the preferred powerline communication channel based on the powerline channel selection unit periodically determining the performance measurements;
provide an indication of the second channel of the plurality of powerline communication channels to the second network device to cause the second network device to change the terminal connection to the second channel of the plurality of powerline communication channels;
the powerline network coupling device is further operable to:
change the terminal connection at the network device to the second channel of the plurality of powerline communication channels; and
the transceiver unit is further operable to:
initiate subsequent communications from the network device to the second network device via the second channel of the plurality of powerline communication channels.

21. One or more non-transitory machine-readable storage media, having instructions stored therein, which, when executed by one or more processors causes the one or more processors to perform operations that comprise:
determining, at a first network device of a powerline communication network, to establish communications with a second network device of the powerline communication network;
periodically determining performance measurements associated with each of a plurality of powerline communication channels associated with the powerline communication network for communicating with the second network device;
determining a preferred powerline communication channel from the plurality of powerline communication channels based on said periodically determining the performance measurements;
providing an indication of the preferred powerline communication channel to the second network device to cause a terminal connection at the second network device to be changed to the preferred powerline communication channel;
changing a terminal connection at the first network device to the preferred powerline communication channel; and
initiating communications from the first network device to the second network device via the preferred powerline communication channel.

22. The machine-readable storage media of claim 21, wherein said operation of determining the performance measurements associated with each of the plurality of powerline communication channels associated with the powerline communication network comprises:
for each of the plurality of powerline communication channels associated with the powerline communication network for communicating with the second network device,
notifying the second network device to change the terminal connection at the second network device in accordance with the powerline communication channel selected by the first network device;
transmitting a sounding request message to the second network device via the powerline communication channel; and
receiving, from the second network device, a sounding response message that indicates at least a subset of the performance measurements associated with the powerline communication channel.

23. The machine-readable storage media of claim 21, after determining that a first channel of the plurality of powerline communication channels is the preferred powerline communication channel, the operations further comprise:
determining that a second channel of the plurality of powerline communication channels is the preferred powerline communication channel based on said periodically determining the performance measurements;
providing an indication of the second channel of the plurality of powerline communication channels to the second network device to cause the second network device to change the terminal connection to the second channel of the plurality of powerline communication channels;
changing the terminal connection at the first network device to the second channel of the plurality of powerline communication channels; and
initiating subsequent communications from the first network device to the second network device via the second channel of the plurality of powerline communication channels.

24. A network device comprising:
a powerline channel selection unit operable to:
determine performance measurements associated with each of a plurality of powerline communication channels associated with a powerline communication network for communicating with a second network device of the powerline communication network;
for each of the plurality of powerline communication channels,
determine whether the performance measurements associated with the powerline communication channel satisfy predefined performance thresholds;
store, in a candidate channel data structure at the network device, the performance measurements associated with the powerline communication channel and an indication of the powerline communication channel in response to determining that the performance measurements associated with the powerline communication channel satisfy the predefined performance thresholds; and
discard the performance measurements associated with the powerline communication channel in response to determining that the performance measurements associated with the powerline communication channel do not satisfy the predefined performance thresholds;
determine a preferred powerline communication channel based, at least in part, on determining whether the performance measurements associated with one or more of the plurality of powerline communication channels satisfy the predefined performance thresholds;

provide an indication of the preferred powerline communication channel to the second network device to cause a terminal connection at the second network device to be changed to the preferred powerline communication channel;

a powerline network coupling device operable to:

change a terminal connection at the network device to the preferred powerline communication channel in response to the powerline channel selection unit determining the preferred powerline communication channel from the plurality of powerline communication channels based on the performance measurements; and a transceiver unit operable to:

initiate communications from the network device to the second network device via the preferred powerline communication channel.

25. One or more non-transitory machine-readable storage media, having instructions stored therein, which, when executed by one or more processors causes the one or more processors to perform operations that comprise:

determining, at a first network device of a powerline communication network, to establish communications with a second network device of the powerline communication network;

determining performance measurements associated with each of a plurality of powerline communication channels associated with the powerline communication network for communicating with the second network device;

for each of the plurality of powerline communication channels, determining, at the first network device, whether the performance measurements associated with the powerline communication channel satisfy predefined performance thresholds;

storing, in a candidate channel data structure at the first network device, the performance measurements associated with the powerline communication channel and an indication of the powerline communication channel in response to determining that the performance measurements associated with the powerline communication channel satisfy the predefined performance thresholds; and discarding the performance measurements associated with the powerline communication channel in response to determining that the performance measurements associated with the powerline communication channel do not satisfy the predefined performance thresholds;

determining, at the first network device, a preferred powerline communication channel based, at least in part, on determining whether the performance measurements associated with one or more of the plurality of powerline communication channels satisfy the predefined performance thresholds;

providing an indication of the preferred powerline communication channel to the second network device to cause a terminal connection at the second network device to be changed to the preferred powerline communication channel;

changing a terminal connection at the first network device to the preferred powerline communication channel; and initiating communications from the first network device to the second network device via the preferred powerline communication channel.

* * * * *